P. E. SPEAKS.
COMBINED COOKER AND SERVICE DEVICE.
APPLICATION FILED APR. 25, 1918.

1,300,504.

Patented Apr. 15, 1919.
2 SHEETS—SHEET 1.

Inventor,
Perry E. Speaks
By
Attorney

P. E. SPEAKS.
COMBINED COOKER AND SERVICE DEVICE.
APPLICATION FILED APR. 25, 1918.

1,300,504.

Patented Apr. 15, 1919.
2 SHEETS—SHEET 2.

Inventor
Perry E. Speaks
By
Attorney

UNITED STATES PATENT OFFICE.

PERRY E. SPEAKS, OF HARRISBURG, PENNSYLVANIA.

COMBINED COOKER AND SERVICE DEVICE.

1,300,504.  Specification of Letters Patent.  Patented Apr. 15, 1919.

Application filed April 25, 1918. Serial No. 230,778.

*To all whom it may concern:*

Be it known that I, PERRY E. SPEAKS, a citizen of the United States of America, and resident of Harrisburg, in the county of Dauphin and State of Pennsylvania, have invented certain new and useful Improvements in Combined Cookers and Service Devices, of which the following is a specification.

This invention relates to domestic cooking vessels and particularly to combined cookers and service platters.

An object of this invention is to provide a composite heating device, which may be employed for a plurality of uses and which may be utilized for maintaining heat under foods prior to and during their service.

A further object of this invention is to produce a heating device which may use liquid fuel, said device having means for controlling the flame and the invention also contemplates the provision of novel means whereby the heater or stove may be detachably applied to a base and be employed successively with cooking or service equipment to economize in this respect. When a base and the parts associated with it have been used in a service and the dish is to be returned to the kitchen for purpose of having it cleansed, the stove may be removed and applied to another base and hence, as stated, an economy will result in the number of heating devices necessary in a certain equipment.

For hotel uses, where planked foods are served, it is possible by the use of this invention to maintain the plank in a highly heated state, so that the foods served thereon will be kept hot, notwithstanding there may be delay in the serving of the food.

The invention has for its object furthermore the provision of a chafing dish or water pan which may be used in connection with a food receptacle and in this connection the hopper will be employed for maintaining the temperature of the water at such intensity as will serve to retain heat in the food while being served or sufficient heat may be generated to cook the contents of the food receptacle, the said device, therefore, being capable of many uses as a combination heating device.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1:
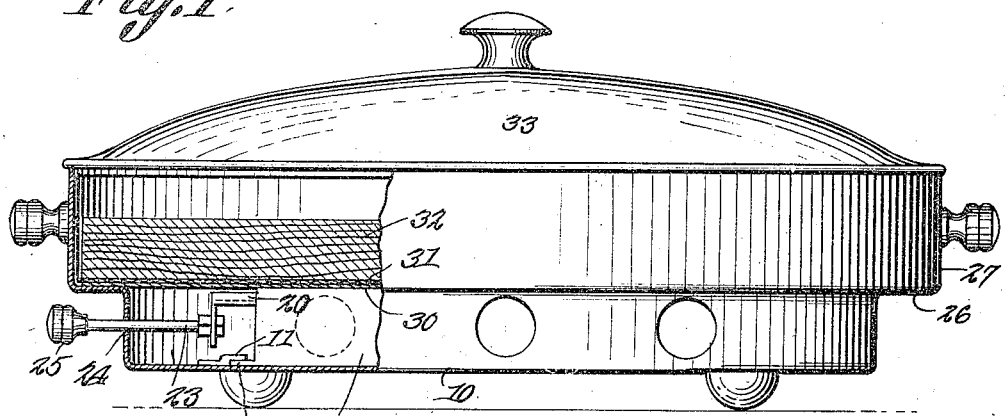
Figure 1 illustrates a view in elevation of a device embodying my invention.
Figure 2:
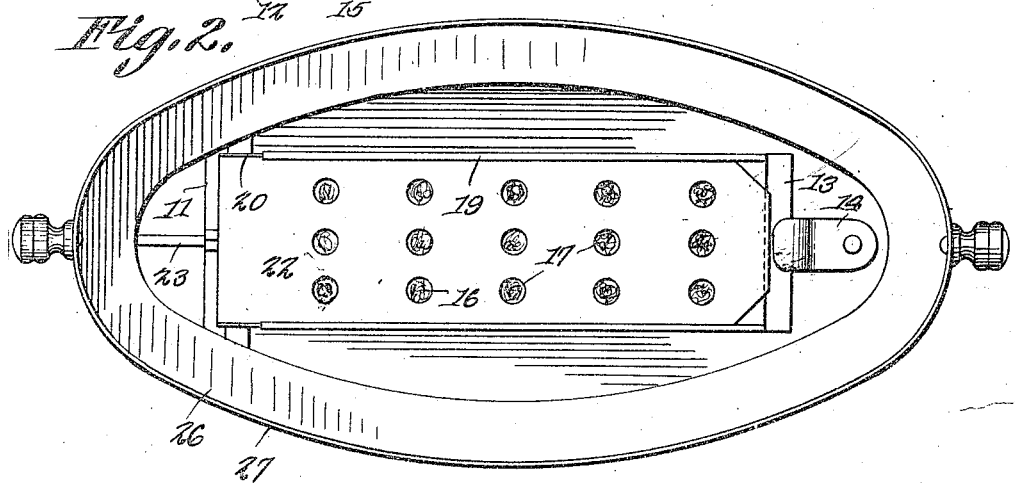
Fig. 2 illustrates a sectional view.
Figure 3:
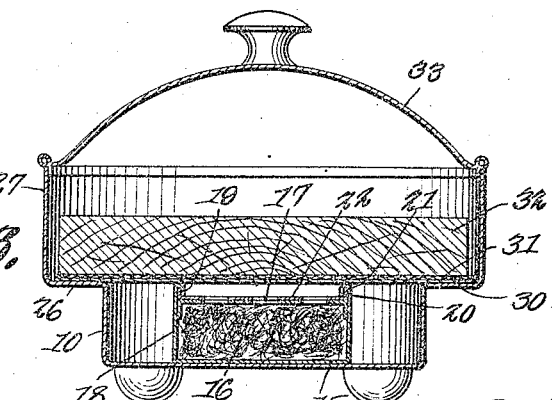
Figs. 3, 4 and 5 are detail views of the receptacles used in connection with the base.
Figure 4:
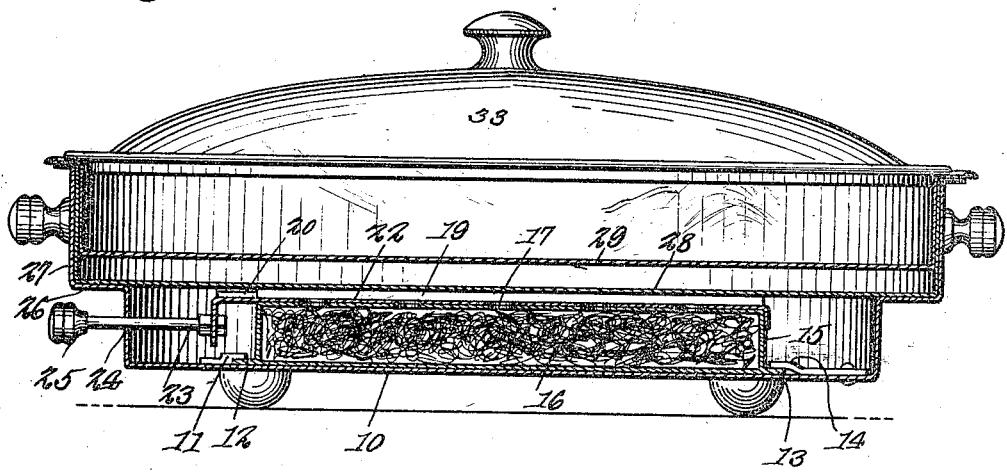
Figure 5:
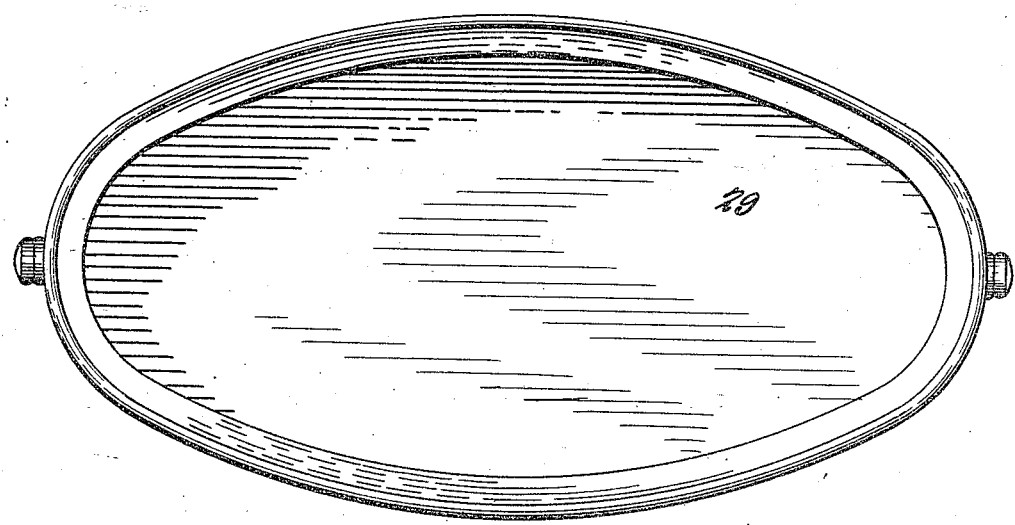

In these drawings 10 denotes the base having a plurality of draft apertures for the circulation of air to support combustion.

On the inside and on the bottom of the base, there is a cleat 11 which forms a seat or socket for the reception of a flange 12 of a stove, thus constituting an anchorage for the stove at one end of the base. The stove also has a flange 13, at the opposite end which is engaged by a pivoted latch 14, the pivot of the latch extending through the bottom of the base and by the use of the latch, which may be swung to position over the flange or clear of it, the stove is anchored or released.

The body 15 of the stove is rectangular and is supplied on its interior with an absorbent, such as asbestos 16, and the top of the stove has a number of holes 17 through which the flame rises. The body of the stove has its sides 18 provided with flanges 19 which are bent inwardly to form ways 20 between the flanges and the sides and these ways constitute clearances for the reception of flanges 21 of the damper 22, the said damper having apertures which coincide with the apertures in the top of the stove when the action of the stove is not to be controlled. When, however, it is desired to reduce the intensity of the heat, the damper may be moved so that the apertures of the damper and stove are out of alinement or nearly out of alinement and this movement will result in restricting the openings through which the flame rises and the flame may be put out entirely by moving the damper so that the body of the damper covers the aperture of the stove.

The damper rod 23 extends from the damper through an aperture 24 in the base and the said damper rod may be supplied with a handle 25 by which it may be manipulated, so that the flame may thus be controlled.

Said body has an outwardly extending flange 26 forming a seat and an upwardly extending rim 27, constituting a housing for pans or for a plank as will presently appear.

Associated with the hopper and base are two nested receptacles 28 and 29, the former of which fits on the base and is designed to contain water, whereas the latter pan fits in the former and constitutes a food tray. These pans may be employed in the capacity of an ordinary chafing dish or they may be used to retain heat in foods that have been cooked, prior to their application to the pan or tray.

In the service of planked foods, it is customary to heat the plank and to apply the food to the heated plank. Ordinarily, the plank is without means of maintaining the heat and radiation results in the plank being cooled with the result that the food becomes cold. In the present invention, I have supplied a protecting plate 30 which can rest on the shoulder or flange of the base and in order to prevent injury to the plank, by reason of the heated condition of the plate, an asbestos pad 31 may be placed on the plate prior to the application of the plank 32 which, during the service of food will be placed in the base.

When a plank has been prepared for the serving of food in the usual way by heating, the heat may be maintained therein by the use of a stove and base constituting a part of the subject matter of this invention and food may be kept palatable notwithstanding a comparatively long time may elapse between its preparation and consumption.

As stated, the nested pans may be employed in a very great number of ways, and a suitable cover 33 of course may be provided which cover can be associated with the nested pans or with the plank since it will be made interchangeable with relation to these elements.

I claim

1. In a cooking, heating and service device, a base having a shoulder intermediate its length and an inclosing flange, a cleat on the bottom of the base having a flange constituting a pocket, a stove body having a flange fitting under the flange of the cleat, a latch pivoted to the base and adapted to engage the flange of the stove, and a damper for controlling the flame of the stove.

2. In a cooking, heating and service device, a base having a shoulder intermediate its length and an inclosing flange, a cleat on the bottom of the base having a flange constituting a pocket, a stove body having a flange fitting under the flange of the cleat, a latch pivoted to the base and adapted to engage the flange of the stove, a damper for controlling the flame of the stove, said stove having sides with inturned flanges forming ways, the said stove having a top provided with apertures, a damper having flanges guided by the flanges of the side and having apertures adapted to aline with the apertures of the stove, and a damper rod for operating the damper.

3. In a cooking, heating and service device, a base having a shoulder intermediate its length and an inclosing flange, a cleat on the bottom of the base having a flange constituting a pocket, a stove body having a flange fitting under the flange of the cleat, a latch pivoted to the base and adapted to engage the flange of the stove, a damper for controlling the flame of the stove, a plate adapted to rest on the flange of the base, and a plank resting on said plate.

4. In a cooking, heating and service device, a base having a shoulder intermediate its length and an inclosing flange, a cleat on the bottom of the base having a flange constituting a pocket, a stove body having a flange fitting under the flange of the cleat, a latch pivoted to the base and adapted to engage the flange of the stove, a damper for controlling the flame of the stove, the flange of the base being adapted to support a plank or nested pans.

5. In a cooking, heating and service device, a base having a shoulder intermediate its length and an inclosing flange, a plate on the bottom of the base having a flange constituting a pocket, a stove body having a flange fitting under the flange of the plate, a latch pivoted to the base and adapted to engage the flange of the stove, a damper for controlling the flame of the stove, a refractory pad on the plate, a plank resting on the pad and partially embraced by the flange of the base.

6. In a cooking, heating and service device, a base having a shoulder intermediate its length and an inclosing flange, a plate on the bottom of the base having a flange constituting a pocket, a stove body having a flange fitting under the flange of the plate, a latch pivoted to the base and adapted to engage the flange of the stove, a damper for controlling the flame of the stove, a plate adapted to rest on the flanges of the base, a refractory pad in the plate, and a plank resting on said pad.

PERRY E. SPEAKS.